Patented May 2, 1933

1,906,221

UNITED STATES PATENT OFFICE

FRITZ BALLAUF, OF COLOGNE-MULHEIM, AND ALBERT SCHMELZER, OF WUPPERTAL-ELBERFELD, GERMANY, ASSIGNORS TO GENERAL ANILINE WORKS, INC., OF NEW YORK, N. Y., A CORPORATION OF DELAWARE

HYDROXY-DIPHENYLINDOLES

No Drawing. Application filed March 26, 1931, Serial No. 525,606, and in Germany April 1, 1930.

The present invention relates to a process of preparing hydroxy-diphenylindoles and to the products obtainable thereby, more particularly it relates to compounds which may be represented by the probable general formula:

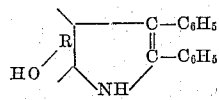

wherein R stands for a benzene or naphthalene nucleus.

It is known from the literature that diphenylbenzindoles or naphthindoles are produced by the action of benzoin or derivatives thereof on amines.

In accordance with the present invention the hydroxy-diphenylindoles of the above identified general formula are obtainable by mixing a hydroxy-aminobenzene or a hydroxy-aminonaphthalene with a free ortho-position to the amino-group, a hydrohalic salt thereof and benzoin, and heating the mixture at a temperature of 130–160° C., favorably in a vacuum, until the evolution of water has ceased.

The process thus performed may be represented by the following scheme:

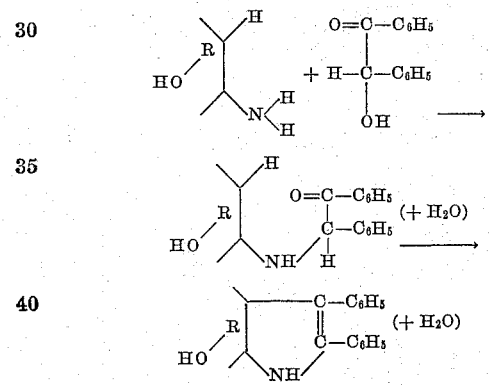

This result could not be anticipated since the hydroxyamines decompose on melting. The Bz-hydroxy- or -naphthoxy-2.3-diphenylindoles which have hitherto been known in literature thus become readily accessible substances. They are generally white crystalline compounds and are valuable intermediate products for the manufacture of dyestuffs.

The invention is illustrated by the following examples, without being limited thereto:

*Example 1.*—21 parts by weight of benzoin, 30 parts by weight of m-aminophenol and 15 parts by weight of m-aminophenol hydrochloride are melted at 130–150° C., most favorably under a low vacuum until about 3.5 parts of water have distilled into an appropriate vessel. The remaining product of the reaction is dissolved in alkali, the solution is filtered and acidified. The crude product is purified either by vacuum distillation, when it distils at 270° C. under 2 mms pressure or by extraction with ligroin. It can be crystallized from dilute methylalcohol, as well as from dilute glacial acetic acid when it is obtained in felt like white needles, melting at 168° C. It has the following constitution:

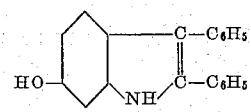

*Example 2.*—21 parts by weight of benzoin, 30 parts by weight of 7-hydroxy-α-naphthylamine and 10 parts by weight of 7-hydroxy-α-naphthylamine hydrochloride are melted at 150° C. until approximately 3.5 parts of water have distilled. The remaining product is then dissolved in alkali, the solution is filtered and acidified. The crude product is best purified by extraction with ligroin; it melts at 197° C., is sparingly soluble in ligroin and toluene and readily soluble in alcohol.

The resulting 7-hydroxy-2.3-diphenyl-naphthindole has the following constitution:

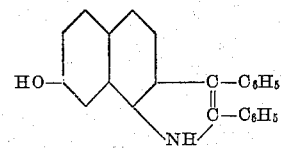

We claim:

1. The process which comprises heating a mixture of a compound of the group consisting of aromatic hydroxyamines of the benzene and naphthalene series with a free ortho-position to the amino-group, a hydrohalic acid thereof and benzoin at a temperature of 130-160° C., until the evolution of water has ceased.

2. The process which comprises heating a mixture of m-aminophenol, m-aminophenol hydrochloride and benzoin at a temperature of 130-150° C., until the evolution of water has ceased.

3. The process which comprises heating a mixture of 7-hydroxy-α-naphthylamine, 7-hydroxy-α-naphthylamine hydrochloride and benzoin at a temperature of 150° C., until the evolution of water has ceased.

4. As new products the hydroxy-diphenyl-indoles of the probable general formula:

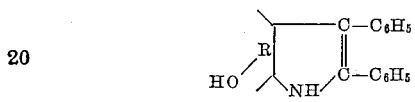

wherein R stands for a benzene or naphthalene nucleus, being generally white crystalline compounds and being valuable intermediate products for the manufacture of dyestuffs.

5. As a new product the compound of the following formula:

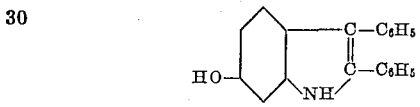

being a white crystalline substance of the melting point 168° C. and being a valuable intermediate product for the manufacture of dyestuffs.

6. As a new product the compound of the following formula:

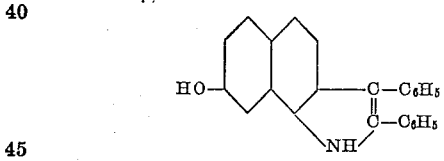

being a white crystalline substance of the melting point 197° C. and being a valuable intermediate product for the manufacture of dyestuffs.

In testimony whereof, we affix our signatures.

FRITZ BALLAUF.
ALBERT SCHMELZER.